United States Patent [19]

Kurakake

[11] Patent Number: 4,611,155
[45] Date of Patent: Sep. 9, 1986

[54] SERVO CONTROL CIRCUIT
[75] Inventor: Mitsuo Kurakake, Hino, Japan
[73] Assignee: Fanuc Ltd., Minamitsuru, Japan
[21] Appl. No.: 683,277
[22] PCT Filed: Apr. 7, 1984
[86] PCT No.: PCT/JP84/00177
 § 371 Date: Dec. 7, 1984
 § 102(e) Date: Dec. 7, 1984
[87] PCT Pub. No.: WO84/04006
 PCT Pub. Date: Oct. 11, 1984

[30] Foreign Application Priority Data
 Apr. 7, 1983 [JP] Japan .................... 58-061316
[51] Int. Cl.$^4$ ............................ G05B 19/28
[52] U.S. Cl. .................... 318/603; 318/636; 318/677
[58] Field of Search .............. 318/603, 636, 677

[56] References Cited
U.S. PATENT DOCUMENTS

| 4,095,157 | 6/1978 | Klauser | 318/603 |
| 4,152,632 | 5/1979 | Peterson | 318/317 |
| 4,321,516 | 3/1982 | Ohtsuka | 318/603 X |
| 4,405,505 | 9/1983 | Swanson et al. | 318/603 X |
| 4,494,057 | 1/1985 | Hotta | 318/317 |
| 4,525,658 | 6/1985 | Yamagida | 318/317 |
| 4,543,516 | 9/1985 | Kobori et al. | 318/317 X |

Primary Examiner—B. Dobeck
Attorney, Agent, or Firm—Staas & Halsey

[57] ABSTRACT

In a servo control circuit for driving a servomotor at a commanded velocity and torque, there are provided a servomotor voltage supply circuit, a servomotor drive current sensing circuit, a servomotor rotation sensor, a single counter for counting rotation sensor pulses, a processor for effecting current loop control based on an applied torque command input, as well as voltage output control of the voltage supply circuit, and a main processor for producing the torque command as an output. A pulse count value during a period $T_1$ for current loop control is accumulated and the result is utilized by the main processor as position information over for a period $T_2$. This allows a counter for position information input to be deleted, thereby providing advantages in terms of construction and economy. The invention is applicable to the control of all types of DC and AC servomotors.

3 Claims, 4 Drawing Figures

SERVO CONTROL CIRCUIT

CROSS REFERENCES TO RELATED APPLICATIONS

This application is related to U.S. application Ser. No. 673,741.

1. Field of the Invention

This invention relates to a servo control circuit for controlling the position, velocity and torque of a servomotor. More particularly, the invention relates to a servo control circuit applicable to control of a servomotor and adapted so as to enable execution of position and velocity loop control and current control on the basis of an output from a single counter which counts pulses of a number corresponding to the rpm of a servomotor.

2. Description of the Related Art

To move an object and position it at a predetermined location, a servomotor and servo control circuit are required as motive sources for obtaining a rotational position, velocity, torque and the like which are in accordance with commanded data. Servo control is executed to produce an output based on a comparison between an externally applied command signal input and a feedback signal indicative of the state of the servomotor.

As shown in FIG. 1, such a servo control system performs position, velocity and current control by feeding back rotation pulses PC from a rotary encoder connected to the shaft of a servomotor 101 (each pulse being generated whenever the servomotor 101 rotates through a predetermined angle of rotation), as well as an armature current I which flows into the servomotor 101.

Specifically, SVU denotes a servoamplifier constituting a current control loop and consisting of a microprocessor 108a which performs processing for current control, an interface circuit 108d for input/output coordination between the servoamplifier SVU and a main amplifier. Also included are set forth below, a counter 108g for counting pulses corresponding to the rpm of the servomotor 101, an analog-to-digital converter circuit (referred to as an A/D converter) 108f for digitizing the armature current of the servomotor 101, and an inverter (voltage supply circuit) 115 for producing as an output a voltage for driving the servomotor 101.

A main processor 150 calculates the difference between a position command PCMD and information indicative of the present position of the servomotor 101, obtains a velocity command VCMD by performing a predetermined position loop calculation, then senses the actual velocity Va of the servomotor 101 based on the present position information. Based on the above data the main processor 150 calculates the difference between the commanded velocity VCMD and the actual velocity Va, and produces as an output a current ICMD which will provide a predetermined servomotor drive torque.

The current command ICMD is delivered to the servoamplifier SVU via an interface circuit 151. In the servoamplifier SVU, the processor 108a calculates the difference between the current command ICMD and the actual current of the servomotor 101 obtained via the AD converter 108f. In other words, the processor performs a predetermined current loop calculation and produces an inverter drive signal as an output. The inverter 115, which is a power amplifier, amplifies the inverter drive signal into a predetermined armature current which is supplied to the servomotor 101. Thus, servomotor control is carried out in such a manner that the servomotor 101 will be rotated to a designated position and at a designated velocity and torque.

In a case where the servomotor 101 is an AC motor such as a synchronous motor, the counter 108g is used to sense the rotational position of the servomotor 101 in order to exercise armature current phase control.

In servo control, the response required for the current control loop is considerably quicker than the response required of the velocity control loop, with the result that the sampling period $T_1$ of the current control loop is short in comparison with the sampling period $T_2$ of the velocity control loop. Accordingly, the position of the rotor of servomotor 101 is sensed by counting the output pulses of the rotary encoder 102 with the counter 108g and processing these output pulses by the processor 108a of the servoamplifier SVU at the sampling period $T_1$. Meanwhile, these output pulses are utilized in the main processor 150 of the positional and velocity control loops as information indicative of the position of the servomotor (i.e., the rotor thereof). However, since the processing time in the position and velocity control loops is $T_2$, as mentioned above, a separate counter 108j is necessary for counting the output pulses during the time $T_2$, and it is required that the status of the counter 108j be transferred as position information to the main processor 150. In other words, it is necessary to provide separate pulse counters corresponding to times $T_2$ and $T_2$.

A problem that arises with the conventional arrangement, therefore, is the need for the separate counter 108j. In addition, since the period of the main processor 150 is the lengthy period $T_2 (=nT_1)$, the counter 108j is required to have a capacity which is n times that of the counter 108g. The higher the positioning precision and the higher the rotational speed, the greater is the capacity required.

SUMMARY OF THE INVENTION

An object of the present invention is to provide a servomotor control circuit in which information indicative of the position of a servomotor can be obtained during the period $T_2$ without providing a counter of a large capacity.

In the present invention, a servo control circuit includes a servoamplifier and a main processor. The servoamplifier has a voltage supply circuit for driving a servomotor, an armature current sensing circuit for the armature of the servomotor, a sensor for producing pulses corresponding to the rpm of the servomotor, a counter for counting the output pulses of the sensor, and a processor connected to the sensing circuit and counter for controlling the output voltage of the voltage supply circuit by executing current loop control at a period $T_1$ in response to an applied torque command. The main processor produces as an output said torque command by executing position and velocity loop control at a period $T_2$ ($T_2 > T_1$) in accordance with servomotor position information. Accordingly, the processor of the servomotor is capable of reading and accumulating the counted value in the counter at the period $T_1$ and of delivering the accumulated value to the main processor as servomotor position information at the period $T_2$. Consequently, only one counter of small capacity capable of counting the period $T_1$ need be provided. The result is greater economy and a simpler circuit construction.

DESCRIPTION OF THE PRESENT EMBODIMENTS

To set forth the invention in greater detail, the invention will now be described in conjunction with the accompanying drawings.

Figure 1:
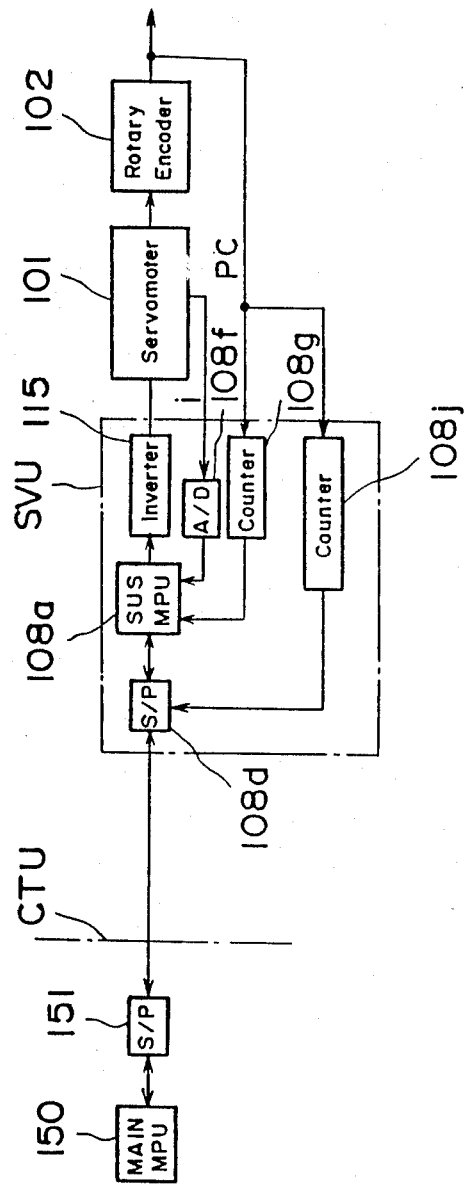
FIG. 1 is a block diagram of a prior-art servo control circuit.
Figure 2:
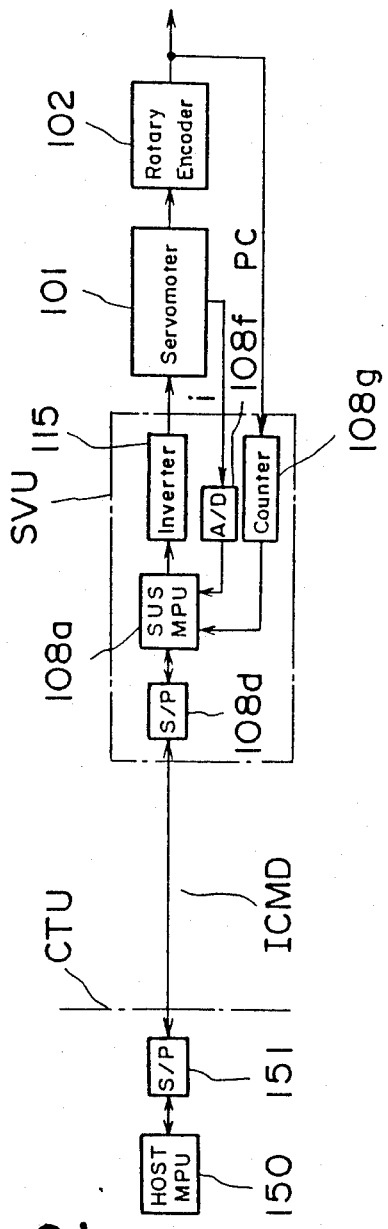
FIG. 2 is a block diagram of an embodiment of the present invention.

FIG. 2 is a block diagram of an embodiment of the present invention, in which portions identical with those shown in FIG. 1 are designated by like symbols. This arrangement is distinguishable over that of FIG. 1 in that the servoamplifier SVU is not provided with the counter 108j. Instead, the arrangement is such that the processor 108a of the servoamplifier SVU accumulates, in its own memory, the status of the counter 108g read at the period $T_1$ for the sake of the current control loop, and transfers the result to the main processor 150 at the period $T_2$ (=n$T_1$).

Figure 3:
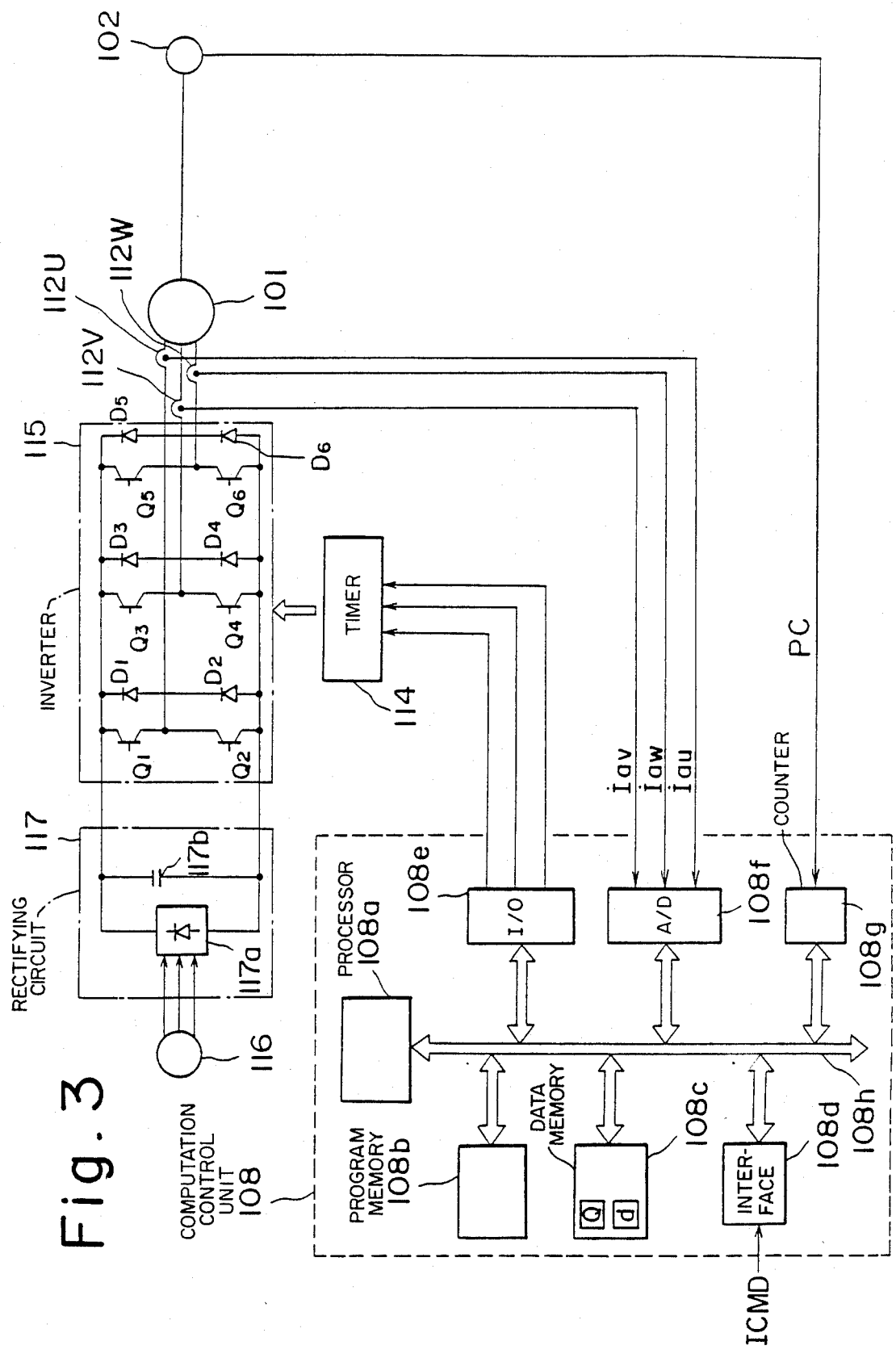
FIG. 3 is a view showing the construction of a principal portion of the arrangement shown in FIG. 1.

FIG. 3 is a view showing the construction of an embodiment of the servoamplifier SVU for such an arrangement. In the example illustrated, a synchronous motor is used as the servomotor. In the Figure, portions identical with those shown in FIG. 1 are designated by like symbols. Numeral 108 denotes a computation control unit composed of a processor 108a for performing arithmetic operations in accordance with a motor control program, a program memory 108b storing the motor control program and a data memory 108c for storing data. Also included are an interface circuit 108d for receiving a current command from the main processor 150, an input/output port 108e for delivering a pulse-width modulation command to a timer circuit, described below, an analog-to-digital (A/D) converter 108f which receives phase currents $I_{au}$, $I_{av}$ and $I_{aw}$ from current sensors 112U, 112V and 112W for converting these into digital values. Further included are a counter 108g in which a position code indicating the initial rotational position $\alpha$ of the field pole of the synchronous motor 101 is initially loaded from the rotary encoder 102, the counter thereafter counting rotation pulses PC generated by the rotary encoder 102 whenever the synchronous motor 101 rotates through a predetermined angle, and an address/data bus 108h for interconnecting the foregoing components. Numerals 112U, 112V and 112W denote current sensors for sensing the actual phase currents of the respective phases. Numeral 114 denotes a timer circuit for producing a pulse-width modulated signal the width whereof depends upon the pulse-width modulation command from the computation control unit 108. Numeral 115 denotes an inverter which is provided with a DC voltage from a rectifying circuit 117 (having a diode group 117a and a smoothing capacitor group 117b) for rectifying the phase currents from an externally provided three-phase power supply 116, and which has six power transistors $Q_1$ through $Q_6$ and six diodes $D_1$ through $D_6$. The power transistors $Q_1$ through $Q_6$ have their on/off action controlled by the pulse-width modulated signal to provide the servomotor 101, such as a synchronous motor, with a drive current.

Figure 4:
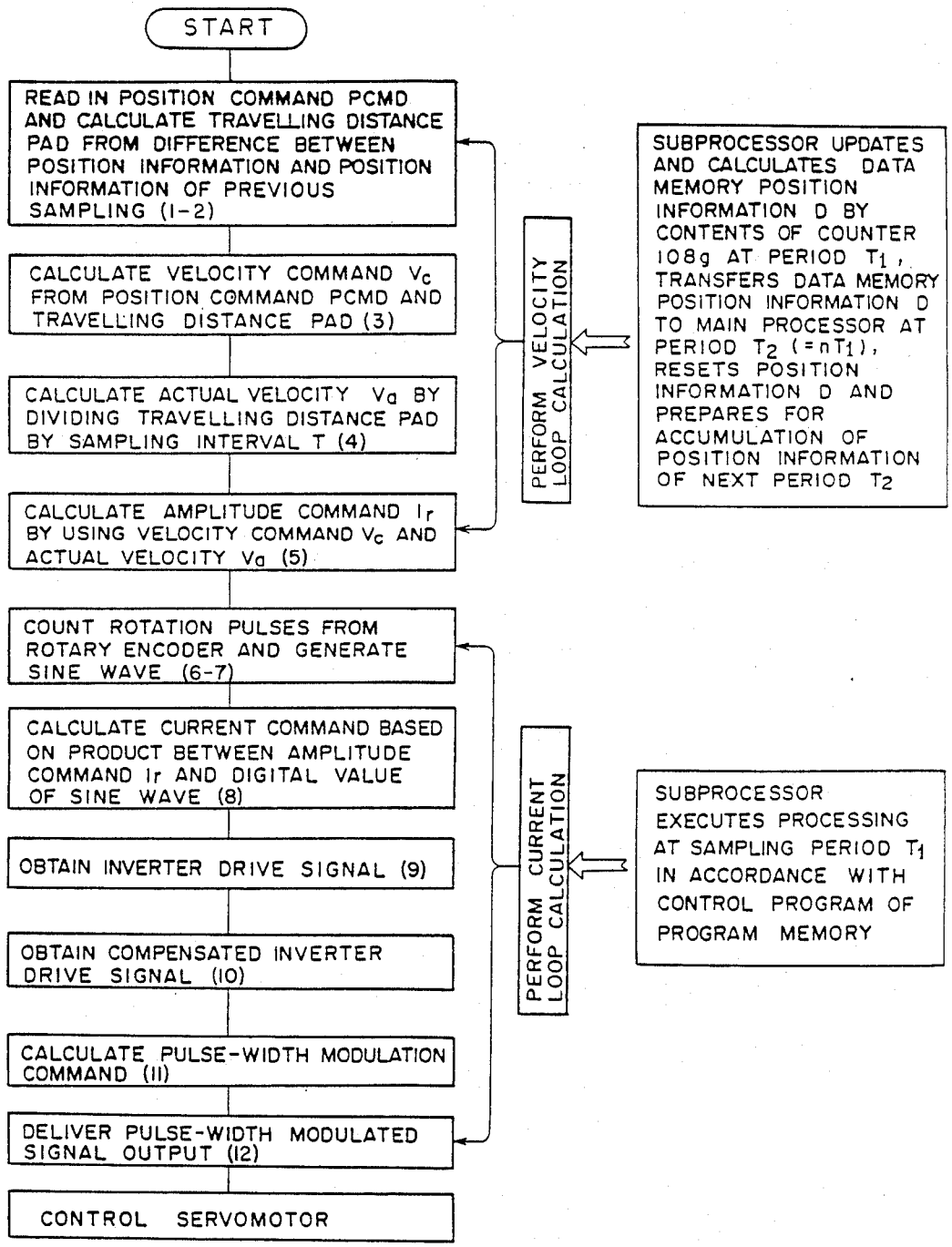
FIG. 4 is a flowchart of the operation of the present invention.

The operation of the circuits shown in FIGS. 2 and 3 will now be described in conjunction with the flowchart of FIG. 4.

[1] To move the synchronous motor 101 to a prescribed position, an NC unit or the like delivers the position command PCMD to the main processor 150.

[2] The main processor 150 calculates a travelling distance PAD from the difference between position information, described below, and position information obtained from the previous sampling (travelling distance calculation step).

[3] Next, the main processor 150 obtains a velocity command $V_c$ (VCMD) by performing the operation indicated by the following equation using the position command PCMD and travelling distance PAD:

$$V_c = K_p(PCMD - PAD) \tag{1}$$

wherein $K_p$ is a constant representing the position loop gain (commanded velocity calculation step).

[4] The main processor 150 divides the abovementioned travelling distance by a sampling interval T to calculate the actual velocity $V_a$ (actual velocity calculation step).

[5] The main processor 150 obtains an amplitude command (effective value current command) $I_r$ by performing the operation given by the following equation using the velocity command $V_c$ and the actual velocity $V_a$:

$$I_r = K_1(V_c - V_a) + K_2\Sigma(V_c - V_a) \tag{2}$$

The result $I_r$ in Eq. (2) corresponds to the amplitude of the armature current. When $I_r$ takes on a large value, a large torque is generated, whereby the actual velocity of the synchronous motor 101 is controlled so as to aproach and come into conformity with the commanded velocity. (This is a velocity loop computation step.)

[6] Next, the main processor 105 transfers the amplitude (torque) command $I_r$ to the servoamplifier SVU via the interface circuit 151.

[7] In the servoamplifier SVU, the processor 108a resets the counter 108g, which has stored the abovementioned position code in the data memory 108c as a present rotational position $\theta$. The counter 108g thenceforth counts the rotation pulses PC from the rotary encoder 102. Next, the processor 108a reads the counted value in the counter 108g via the bus 108h. The processor then adds this to the position code in the data memory 108c to update the present rotational position $\theta$, and to position information d to update the position information d. After the counter 108g has been reset, the processor 108a retrieves a counted value $\theta - \sin \theta$, $\sin (\theta + 2\pi/3)$ conversion table stored in the data memory 108c, and obtains digital values of $\sin \theta$, $\sin (\theta + 2\pi/3)$ corresponding to the rotational angle $\theta$. (This is a sinusoidal wave generation step.)

[8] The processor 108a multiplies the amplitude command Ir, which was transferred in step [6], by the digital values of $\sin \theta$, $\sin (\theta + 2\pi/3)$ to obtain two-phase current commands IR and IS:

$$IR = I_r \sin \theta$$

$$IS = I_r \sin(\theta + 2\pi/3) \quad (3)$$

Next, the processor 108a obtains a current command IT, in accordance with the following equation, from the two-phase current commands IR and IS:

$$\begin{aligned} IT &= -IR - IS \\ &= I_r \cdot \sin(\theta + 4\pi/3) \end{aligned} \quad (4)$$

(This is a current command calculation step.) It should be noted that the calculation of Eq. (4) can be dispensed with if $\theta - \sin\theta$, $\sin(\theta + 2\pi/3)$, $\sin(\theta + 4\pi/3)$ conversion tables are provided as the conversion tables in step [7].

[9] Next, the processor 108a reads, via the bus 108h, the actual phase currents obtained by a digital conversion applied by the A/D converter 108f to the actual phase currents $I_{av}$, $I_{aw}$ and $I_{au}$ obtained from the current sensors 112U, 112V and 112W, respectively, computes errors between the three phase current commands IR, IS and IT and the actual phase currents $I_{av}$, $I_{aw}$ and $I_{au}$ and multiplies the errors by a predetermined coefficient of amplification K to obtain digital inverter drive signals UR, US, UT. The foregoing is a current loop computation step.

[10] Next, the processor 108a multiplies the actual velocity Va, which was obtained in the foregoing velocity loop computation step, by the coefficient kf, obtains a velocity compensation output VCO, and subtracts this from the inverter drive signals UR, US and UT, thereby obtaining compensated inverter drive signals UR, US and UT. Thus, the current loop is prevented from experiencing a drop in gain caused by a back electromotive force ascribable to the actual velocity $V_a$ of the synchronous motor 101. (This is a current loop compensation step).

[11] The processor 108a forms pulse-width modulation commands $t_u$, $t_v$ and $t_w$ which depend upon the values of these inverter drive signals UR, US and UT. That is, the processor computes pulse-width modulation commands $t_u$, $t_v$ and $t_w$ indicative of pulse-width values conforming to the values of the inverter drive signals UR, US and UT. (This is a pulse width modulation step.)

[12] The processor 108a delivers these commands $t_u$, $t_v$, $t_w$ to the timer circuit 114 via the bus 108h and input/output port 108e (command output step). The timer circuit 114 produces pulse-width modulated signals of a predetermined duration depending upon the commands $t_u$, $t_v$ and $t_w$ and delivers these signals to the transistors Q1 through Q6 of the inverter 115 to supply the synchronous motor 101 with three-phase current.

The processor 108a controls the synchronous motor 101 by executing the above-described current loop computations of steps [7]–[12] in accordance with the control program in the program memory 108b at the sampling period T1, whereby the synchronous motor 101 is eventually rotated at the commanded velocity.

The processor 108a updates and accumulates the position information d in the data memory 108c at the period T1 in accordance with the contents of the counter 108g, transfers the position information d in the data memory 108c to the main processor 150 via the interface circuit 108d at the period $T_2(=nT_1)$, resets the position information d of the data memory 108c, and prepares for accumulating the position information at the next sampling instant of period T2. More specifically, the data memory 108c accumulates the number of rotation pulses PC from the rotary encoder 102 over the period T2. This information is utilized by the main processor 150 to perform the above-described steps [1]–[5] at the period T2.

In the embodiment described above, the position and velocity loop computations are executed by the single main processor 150. However, separate processors can be provided for the position and velocity control loops. Also, the servomotor is not limited to a synchronous motor, for induction and DC motors can also be used.

The present embodiment, due to the foregoing construction and operation, is an arrangement that allows the processor of the servoamplifier read and accumulate the counter value at the period T1, and send the accumulated value as the position information to the controller at the period T2. Therefore, a counter need not be specially provided for the position information, costs can be lowered greatly and size reduced.

Thus, according to the present invention as described above, a processor provided in a servoamplifier reads and accumulates, at the period T1, output pulses corresponding to the rpm of a servomotor, and sends the accumulated value as servomotor rotational position information to an external main processor. Accordingly, a special counter for sensing position information is no longer necessary, the servo control circuit can be reduced in cost and simplified, and the mounted structure can be made smaller in size. The invention is well-suited for use in improving the position, velocity and torque servo characteristics of a variety of motors.

I claim:

1. A servo control circuit for a servomotor, comprising:
    a servoamplifier comprising:
        a voltage supply circuit for supplying said servomotor with a drive voltage;
        a sensing circuit for sensing a drive current of said servomotor;
        a rotation sensor, coupled to said servomotor, for producing output pulses corresponding to the rpm of said servomotor;
        a single counter, connected to said rotation sensor, for counting the output pulses of said rotation sensor; and
        a servoamplifier processor, connected to said voltage supply circuit, said sensing circuit and said counter, for controlling an output voltage of said voltage supply circuit by executing current loop control during period T1 in response to an applied torque command input and producing position information from the count; and
    a main processor, connected to said servoamplifier, for producing as an output said torque command by executing position and velocity loop control during a period T2 ($T_2 > T_1$) in dependence upon the position information from said servomotor, said servoamplifier processor reading and accumulating a value from said counter during the period T1 and delivering the accumulated value to said main processor as said position information at the end of period T2.

2. A servo control circuit according to claim 1, wherein said voltage supply circuit comprises an inverter driven by a pulse-width modulated drive signal.

3. A servo control circuit according to claim 1, wherein said sensing circuit for sensing the drive current of said servomotor comprises a galvanometer for sensing an actual phase current in each phase of a three-phase input power supply.

* * * * *

UNITED STATES PATENT AND TRADEMARK OFFICE
CERTIFICATE OF CORRECTION

PATENT NO. : 4,611,155

DATED : September 9, 1986

INVENTOR(S) : MITSUO KURAKAKE

It is certified that error appears in the above-identified patent and that said Letters Patent is hereby corrected as shown below:

Front page, [57] "ABSTRACT", line 13, delete "over".

Fig. 1 should be labelled "Prior Art"

Col. 2, line 31, "$T_2$ and" should be --$T_1$ and--.

Col. 6, line 11, "read" should be --to read--.

Signed and Sealed this

Seventeenth Day of February, 1987

Attest:

DONALD J. QUIGG

Attesting Officer     Commissioner of Patents and Trademarks